Figure 5:
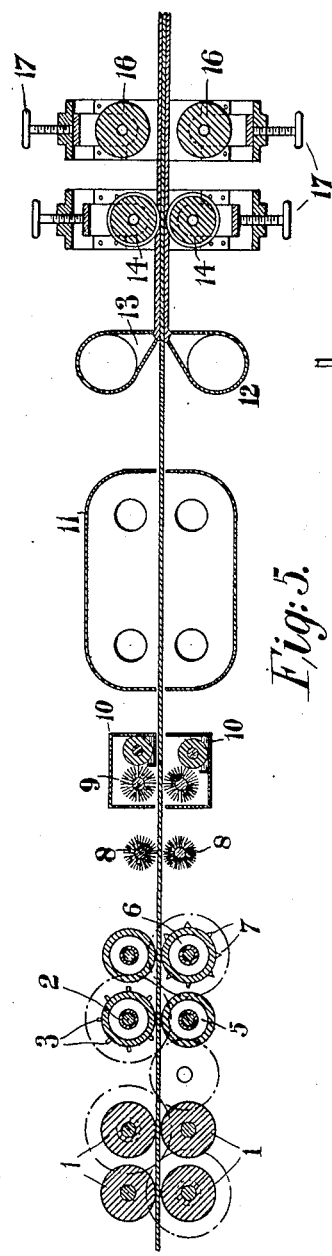

No. 869,638. PATENTED OCT. 29, 1907.
G. S. MAYHEW.
PROCESS FOR MAKING WOODEN CORED PLASTER SLABS FOR BUILDING AND OTHER PURPOSES.
APPLICATION FILED JULY 11, 1905.
3 SHEETS—SHEET 1.
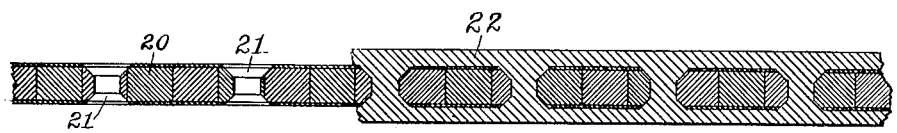
Fig: 1.
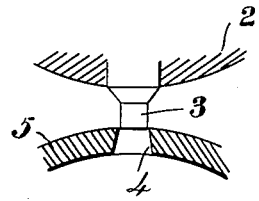
Fig: 7.
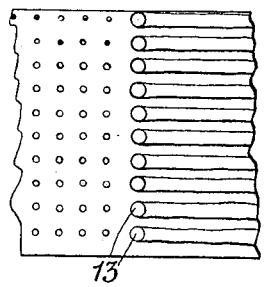
Fig. 8.

No. 869,638. PATENTED OCT. 29, 1907.
G. S. MAYHEW.
PROCESS FOR MAKING WOODEN CORED PLASTER SLABS FOR BUILDING
AND OTHER PURPOSES.
APPLICATION FILED JULY 11, 1905.
3 SHEETS—SHEET 2.
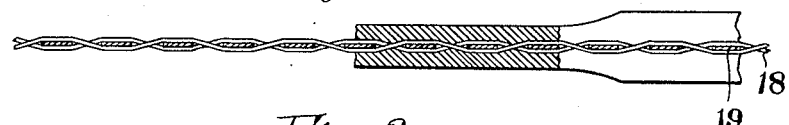
Fig. 2.
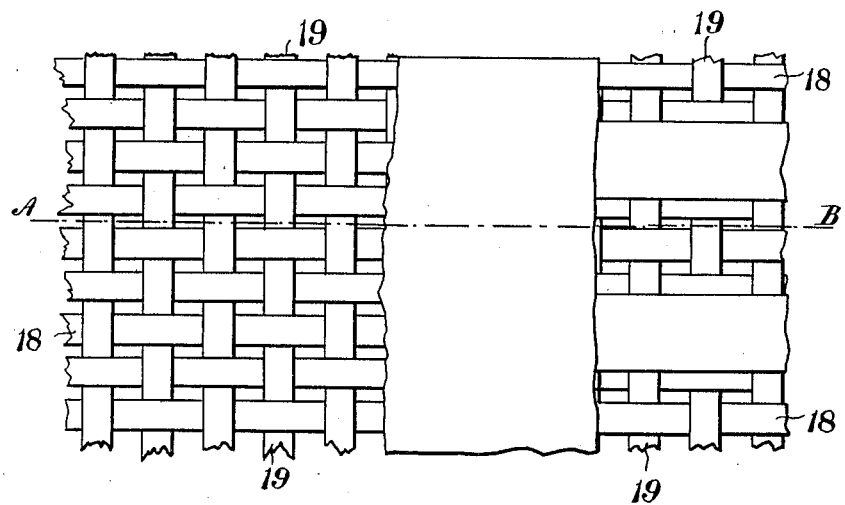
Fig. 3.
Fig. 4.
Witnesses
Edwin D Bartlett
John A. Jordan
Inventor
George Staats Mayhew
per Herbert Sefton Jones
Attorney.

No. 869,638. PATENTED OCT. 29, 1907.
G. S. MAYHEW.
PROCESS FOR MAKING WOODEN CORED PLASTER SLABS FOR BUILDING AND OTHER PURPOSES.
APPLICATION FILED JULY 11, 1905.

3 SHEETS—SHEET 3.

Witnesses
Edwin D. Bartlett
John A. Jordan

Inventor
George Skaats Mayhew
per Herbert Sefton Jones
Attorney

UNITED STATES PATENT OFFICE.

GEORGE SKAATS MAYHEW, OF LONDON, ENGLAND, ASSIGNOR, BY MESNE ASSIGNMENTS, TO THE AMERICAN MAYHEW COMPO BOARD SYNDICATE LIMITED, OF LONDON, ENGLAND.

PROCESS FOR MAKING WOODEN-CORED PLASTER SLABS FOR BUILDING AND OTHER PURPOSES.

No. 869,638.

Specification of Letters Patent.

Patented Oct. 29, 1907.

Application filed July 11, 1905. Serial No. 269,173.

*To all whom it may concern:*

Be it known that I, GEORGE SKAATS MAYHEW, a citizen of the United States of America, residing at 2 Basinghall avenue, in the city and county of London, England, have invented certain new and useful Improvements in Processes for Making Wooden-Cored Plaster Slabs for Building and other Purposes, of which the following is a specification.

The present application relates to an improved form of fireproof wooden-core plaster slab for partitions and ceilings in buildings.

In the construction of plaster slabs as hitherto used for lining walls and ceilings the material of which they have been composed has been mixed and poured into forms or pressed out into flat sheets. The nature of the materials used has been such that when the slabs so made were dried out they were either too brittle, if made in thin sheets or if toughened by the use of a considerable amount of fibrous material such as wood, wool, cocoa fiber, real or artificial hair, straw, grass or dried rushes they were less rigid than is necessary to have them hold their shape when placed in position. If such a plate has been made either with or without toughening to be thick enough to retain its shape under such strains as they are liable to be subjected to it has been too heavy to admit of profitable handling when the place of consumption is far distant from where they were made and so their use has been confined to comparatively restricted areas. According to the present invention a strong smooth and rigid fireproof slab or plate of great size and toughness is produced which is still light enough to admit of profitable long distance shipments.

In order to carry out my invention I perforate a sheet of compo board faced on both sides with fireproof paper or the like. This sheet which forms the core of the slab after having been perforated is coated on both sides with a thick fireproof adhesive plaster the said perforations locking said plaster to the core when dried. Instead of the above mentioned compo board core I may use a core plaited from thin strips cut from fireproof planks or logs of tough straight grained wood. This plaited core is coated on both sides with a fire proof plaster which is pressed through the openings in the loosely plaited core and thus locked into a solid mass.

Figure 6:
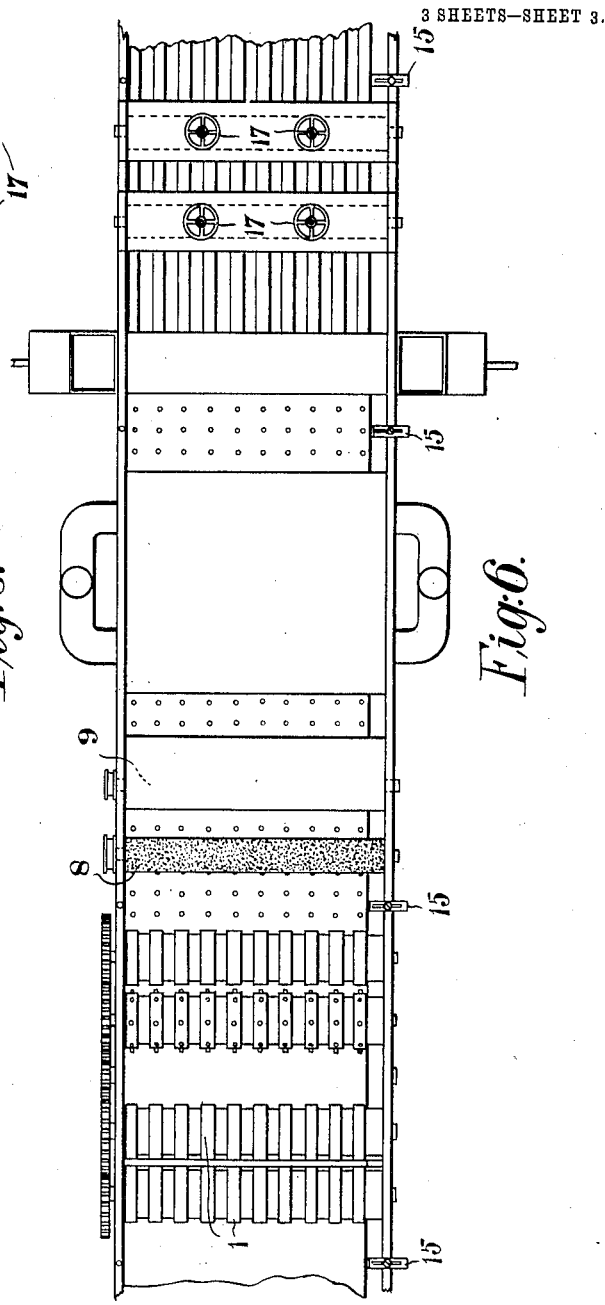

My invention is more particularly described with reference to the accompanying drawings, in which Figure 1 shows a section through a perforated compo board core faced on both sides with plastic material. Fig. 2 shows a section through a built up strip of wood for weaving into a core. Fig. 3 shows a plaited core partly faced with cement. Fig. 4 shows a plan view of Fig. 3. Fig. 5 shows a machine for perforating a compo board core and facing it on both sides with plastic material. Fig. 6 shows a plan view of Fig. 5, and Fig. 7 is a detail view showing a perforating punch registering with a perforating die. Fig. 8 is a diagrammatic plan view illustrating the method of applying the plaster in lines or ridges to the core of the slab.

Referring now to Figs. 1, 5, 6 and 7 of the drawings. I first take a compo board sheet forming the core and pass it through the machine shown in Figs. 5 and 6. The said compo board core first passes through two sets of feeding rollers 1 driven at the same rate of speed. These rollers carry the core to the perforating rollers which consist of an upper roller 2 provided with a number of cutting punches 3 (more particularly shown in Fig. 7) adapted to register with corresponding dies 4 arranged in a hollow lower roller 5. The punches 3 cut through and counter sink on the upper side of the board a series of perforations. The core then passes to a second pair of rollers 6 which counter sink by means of the projections 7 the perforations on the lower side of the board. Passing on from said counter-sinking rollers the core passes to a pair of steel brushes 8 which revolve rapidly and clean off any small particles of wood or paper left adhering to the core by the perforating and counter-sinking rollers. After having been cleaned by said rollers 8 the core passes between upper and lower cement or size tanks 10, the brushes 9 distributing a thin sizing material evenly over the surfaces of the paper lined core and introducing said sizing material into the cut faces of the perforations to facilitate the adhesion of the plaster faces to the core. From said size tanks the core passes through a hot air chamber 11 which quickly dries the perforated core on both sides and prepares it for the plastering apparatus. This plastering apparatus consists of upper and lower tanks 12 provided with spouts 13 through which lines or ridges of thick plastic plaster or paste are forced onto the top and bottom faces of the core by means of plungers operating in said tanks 12 over the perforations formed by the perforating rollers. (See Fig. 8.) These lines of plastic plaster adhere to the faces of the core in such a quantity that there is always an ample supply of plaster when the core passes to the grooved rollers 14 which form the cementing material into regular ridges or rows over the perforations formed in the core, the said ridges of plaster corresponding with the grooves of the rollers while the intervening spaces on the non-perforated parts of the core correspond with the projecting parts of the rollers. By means of the perforations a complete union is made between the upper and lower lines of plaster on the faces of the core said plaster being forced into and through the perforations so that when dried it is locked down the center of the lines of plaster on to the faces of the core. The perforated core ridged with plaster as above described is then taken from the machine and placed between suitable ventilated frames where it is thoroughly dried. The machine shown in Figs. 5 and 6 is then adjusted by means of the stops 15 in order that the parts of the core which have heretofore not been perforated or plastered will now correspond with the punches 3 and counter-sinking tools 7 and plaster spouts 13. The core is then passed through the machine again and perforated between the above described rows of plaster and cemented and then plastered in the newly perforated spaces intervening between said plaster rows. Finally the core passes to the flat rollers 16 which have been adjusted by means of the adjusting mechanism 17 to press against the plaster faces of the core to distribute the plaster into all the existing depressions thereby completely coating the core and filling all the perforations and so forming a solid wooden-cored plaster slab. In this manner a strong smooth rigid fireproof slab or plate of great size and toughness is produced which when dried and trimmed is sufficiently light in weight to admit of being profitably shipped long distances.

Referring to Fig. 1, 20 denotes the compo-board, 21 the countersink openings through the same, and 22 the plaster coating on both sides of said core and locked to the latter through the said openings.

The rollers and brushes in the above described machine are ridged to correspond with perforating punches and paste spouts to allow the core to be passed a second time through the machine and are all capable of adjustment to allow of a slab of any desired thickness being produced.

As an alternative method of forming a plaster slab while using essentially the same materials and the same machine as shown in Figs. 5 and 6 except the perforating rollers 2, counter-sinking rollers 6 and cleaning rollers 8, I use a core plaited from strips of wood to which it will be obvious the plaster may be locked as in the above described perforated compo board core. To carry out this method I first fireproof planks or logs of thin straight grained wood, preferably cotton wood or elm; I cut from these logs or planks a thin veneer running the length of the log and being at the same time cut into narrow strips by knives set at right angles to the flat blade which cuts the veneer from the log or plank. The strips forming the warp 18, that is to say, the strips running lengthwise in the sheet to be plaited, are cut only half the thickness of those forming the weft 19. After these strips have been cut they are passed through hot pressure rollers which extract all the moisture; the thinner strips are then coated at one side with a thin coating of fireproof adhesive cementing material and made into an endless coil by joining two thicknesses together and pressing them firmly so that they cannot separate and by arranging that the end of each strip overlaps the end of the strip to which it is joined as shown in Fig. 2. The strips so formed are then plaited by any suitable plaiting machine into a core of the width desired. If desired the edges of this plaited core may be bound by suitable strips of metal to hold it together until it is plastered. This core may be coated in regular lines with plastic material by the machine shown in Figs. 5 and 6, without the perforating and counter-sinking rollers and cleaning brushes and after having been dried the spaces formed between said ridges of plastic material are then filled up with fresh ridges of plastic material and the plaster slab thus formed pressed together on both sides by spreading rollers which firmly unite the plastic material together and forces it into and through the open spaces of the core which is then dried and trimmed and cut into the lengths desired. This plaited core may be faced at once over its whole surface with plaster and not plastered in strips as in the perforated compo board above described.

What I claim is:—

1. The herein-described process for producing a wooden-cored plaster slab in a continuous sheet, consisting in perforating a compo-board core in lines, distributing a thin coating of adhesive sizing material over said perforated compo-board core, drying said sized core on both sides, feeding ridges or lines of thick plaster on both sides of said perforated core and pressing the faces of the core when completely coated with lines of plaster so that said lines of plaster are locked to the core through the perforations in the latter and are formed, with the core, into a solid slab.

2. The herein-described process for producing a wooden-cored plaster slab in a continuous sheet, consisting in perforating a compo-board core with lines of perforations at regular intervals, feeding ridges or lines of thick plaster over said lines of perforations on both sides of said perforated core, forming said lines of plaster into regular rows, drying said plaster-ridged core, re-perforating said core between said ridges of plaster, feeding lines or ridges of plaster on both sides of said core above the new perforations, and pressing the faces of the core when completely coated with lines of plaster so that said lines of plaster are locked to the core through the perforations and are formed, with the core, into a solid slab.

In testimony whereof I have signed my name to this specification in the presence of two subscribing witnesses.

GEORGE SKAATS MAYHEW.

Witnesses:
LEONARD EDMUND HAYNES,
GEORGE ISAAC BRIDGES.